R. P. Cunningham.

Shuttle Motion

No. 81

Reissued Mar. 14, 1846

BEST AVAILABLE COPY

UNITED STATES PATENT OFFICE.

ROBERT P. CUNNINGHAM, OF ABINGTON, CONNECTICUT.

IMPROVEMENT IN THE MODE OF THROWING SHUTTLES IN POWER-LOOMS.

3052

Specification forming part of Letters Patent No. 3,052, dated April 25, 1843; Reissue No. 81, dated March 14, 1844.

*To all whom it may concern:*

Be it known that I, ROBERT P. CUNNINGHAM, of Abington, in the county of Windham and State of Connecticut, and town of Pomfret, in the said State of Connecticut, have invented new and useful Improvements in the Method of Driving Shuttles in Power-Looms, (for which Letters Patent were granted unto me bearing date the 25th day of April, in the year 1843,) which said Letters Patent are inoperative on account of defective specifications; and I do hereby declare that the following is a full, clear, and exact description of the principle or character which distinguishes this my invention from all other things before known, and of the manner of making, constructing, and using the same, and of the various modes in which I have contemplated the application of my said improvements, reference being had to the accompanying drawings, making part of this specification, in which—

Figure 2:
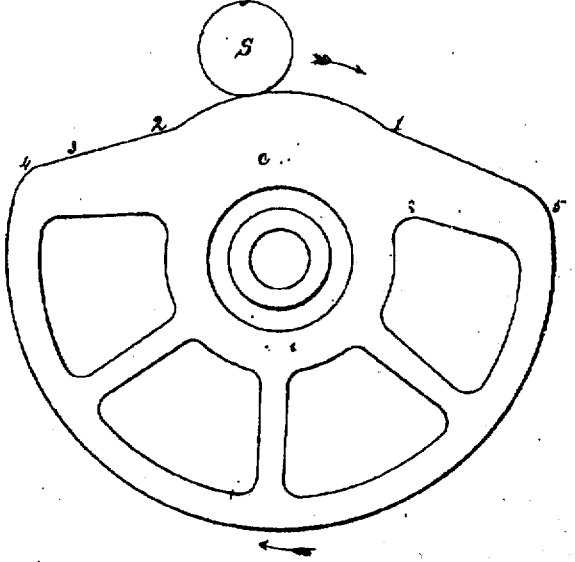
Figure 4:
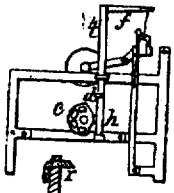
Figure 3:
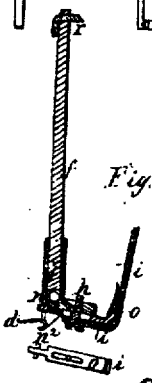
Figure 1:
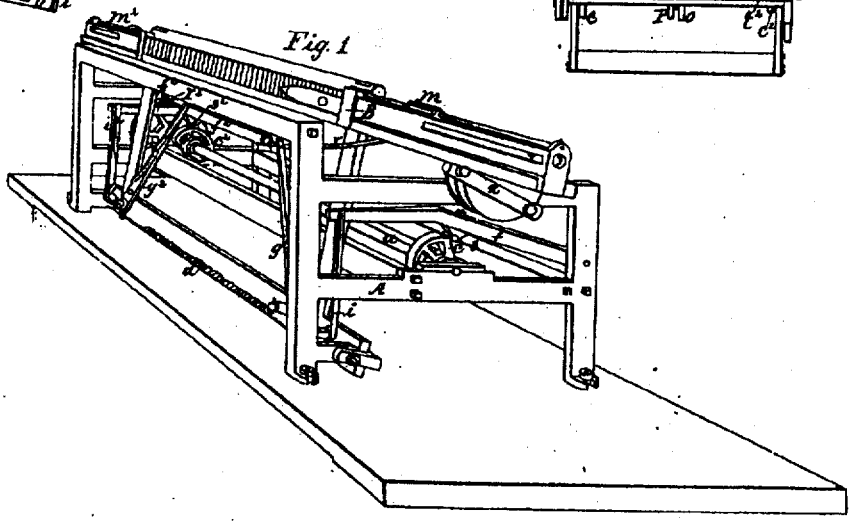

Figure 1 is a perspective view of a loom with my improvement applied; Fig. 2, an enlarged view of one of the shuttle-cams; Fig. 3, a representation of the picker-staff separately; Fig. 4, an elevation, and Fig. 5 a plan of the Scotch loom with my improvement applied, and which is similarly applicable to English patterns.

The usual method of operating the pickers of a loom is to draw back the picker-staff directly after the shuttle has been thrown, that it may not impede the shuttle on its return, but permit it to be arrested by a spring, usually employed in shuttle-boxes for this purpose, or by the picker at the end of the shuttle-box. The evil consequences of this method is a jar at the end of the motion of the shuttle, known to be very injurious, as tending to the speedy wear of the lay of a loom. The spring usually employed in the shuttle-box to arrest the momentum of the shuttle effects this end only in part, and is objectionable, because it retains its hold on the shuttle at the commencement of the next throw, requiring a wasteful expenditure of force to overcome it at the commencement of each throw of the shuttle.

The object of my invention is to save, in part, this waste of power, and to arrest the shuttle at the end of its course without occasioning the jar experienced in the methods heretofore practiced, and which consists in so forming the cams that operate the shuttle-levers as to give them a retrograde movement which commences before the shuttle reaches the picker, and which gradually retards it in accordance with that law of mechanics by which the momentum of a moving body can be arrested with the least resistance, that part of the shuttle-levers which the cams act on being retained in contact by a spring or springs, or by other means.

In the accompanying drawings, A represents the frame of a loom; B, the lay; *a*, the cam-shaft; *f f'*, the shuttle-levers; *t t'*, the straps that connect them with *g g'*, the picker-staffs; and *r r'* the straps that connect these with the pickers *m m'*. The shuttle-cams *c c'* are attached each to one end of the shaft *a* in a reversed position, to communicate motion to the shuttle alternately. The form of these cams is fully represented on an enlarged scale at Fig. 2. From 1 to 2, in the reverse direction of the arrows, (including a small portion of the circumference,) they are concentric, and at 2 the diameter begins to increase, first gradually and then more suddenly, and forming from 2 to 3 a curve of easiest acceleration, so as to accelerate the motion of the shuttle and give it the requisite velocity with the least resistance and expenditure of force, and therefore in a great measure avoiding the breaking of the filling-threads. From 3 (the point of maximum velocity and where the shuttle should leave the picker) the cams are gradually curved, to arrest the motion of the picker, until at 4 they become concentric, and continue so for more than half the circumference, the length of this concentric part being varied to suit the width of fabric for which the loom is intended, a greater length being required for wide than for narrow fabrics. At 5 the diameter of the cam begins to decrease until it joins the concentric part at 1, the curve from 5 to 1 being similar to the curve from 2 to 4.

The shuttle-levers *f f'* are provided with stump-faces or friction-rollers *s s'*, that rest on the cams *c c'*, and these are kept onto the faces of the loms, to cause them to follow the curves thereof, by a helical spring, *d*, attached to the picker-staffs *g g'* below their fulcra, this mode of arranging the shuttle levers and staffs being well known to those skilled in the art of constructing and mounting power-looms. During the rotation of the cam *c*, as its face acts on the stump-face or roller *s* in passing from the point 1 to 2, the lever is gradually started. From this arrangement it will be apparent that the cam *c* in its circuit acts on the stump-face or roller *s* and operates the shuttle-lever *f*, so that in passing from 2 to 3 an accelerating motion is communicated to the picker to drive the shuttle, first beginning very slowly, and gradually increasing until at 3 it has reached the maximum of velocity, and then the shuttle leaves the picker, as its motion is gradually arrested as the cam travels from 3 to 4, where it becomes concentric, and continues so to 5, the picker during this time remaining at the inner end of the shuttle-box to await the return of the shuttle, which is thrown back by the same operation of the cam *c'* on the lever *f'*, and just before it (the shuttle) on its return reaches the picker *m* the stump-face or roller *s* begins to descend from 5 to 1, which gives to the picker a retrograde movement, so that the shuttle overtakes it while the two are traveling in the same direction, and as the cam approaches 1 the momentum of the two is gradually arrested as it was gradually started before, and as the concentric part of the cam from 1 to 2 passes the harness shifts preparatory to another throw. The same set of motions, it will be perceived, take place at the other side, the two cams *c c'* being formed alike and placed on the shaft the reverse of each other. The stump-faces or rollers *s s'* are placed a little forward of a vertical line passing through the axis of the cams, as this avoids friction to some extent.

The manner in which I prefer to construct the picker-staffs is represented in section at Fig. 3. The lower end of the staff *f* is embraced between two flanges of a metallic nut, *n*, which turns on a stud-pin projecting from the lay B of the loom, and this nut has an arm, *h*, nearly at right angles, to which is attached, by means of a screw, a sector, *o*, which receives the strap *i*, that forms the connection between the picker-staff and the shuttle-lever. Another short arm projects from the nut *n* below its axis and in a line with the staff, to which is attached the helical spring *d*, by which the stump-faces or rollers *s s'* are kept onto the face of the cams *c c'*.

If desired, other methods of keeping the stump-faces or rollers of the shuttle-levers onto the face of the cams may be employed, such as a second set of cams acting on a second set of levers connected with the shuttle-levers by straps passing around wheels or sectors on the picker-staffs; but I prefer the mode above described.

Figure 5:
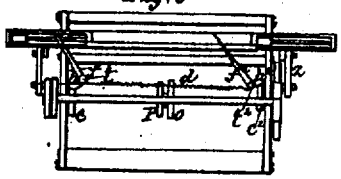

It will be borne in mind that my improved cams are applicable to other modes of arranging the picker-staffs, one example of which is represented in Figs. 4 and 5, which represent the Scotch loom, in which the pickers are connected with horizontal picker-staffs *f f'*, attached to and vibrating with vertical arbors *t t'*, from which project arms or levers *h h'*, that are acted on by the picker-cams *c c'*, a spring, *d*, being employed to keep these arms in contact with the face of the cams, as fully explained above.

Having thus fully explained the principle or character of my invention and indicated the various modes of applying the same, what I claim as my invention, and desire to secure by Letters Patent, is—

Forming the picker-cams substantially as herein described, to give the pickers a retrograde movement gradually, for the purpose of arresting the momentum of the shuttle at the end of its course, as herein fully described.

ROBERT P. CUNNINGHAM.

Witnesses:
CHAS. I. GROSVENOR,
ORRIN SUMNER.